US006988194B2

(12) United States Patent
Nunn et al.

(10) Patent No.: US 6,988,194 B2
(45) Date of Patent: Jan. 17, 2006

(54) SYSTEM AND METHOD FOR PRESERVING BOOT ORDER IN AN INFORMATION HANDLING SYSTEM WHEN A BOOT DEVICE IS REPLACED BY A MATCHING DEVICE

(75) Inventors: Susan A. Nunn, Austin, TX (US); Peter A. Woytovech, Round Rock, TX (US); Lowell B. Dennis, Pflugerville, TX (US); Brian J. Decker, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 547 days.

(21) Appl. No.: 10/170,817

(22) Filed: Jun. 13, 2002

(65) Prior Publication Data

US 2003/0233535 A1 Dec. 18, 2003

(51) Int. Cl.
*G06F 9/00* (2006.01)

(52) U.S. Cl. ........................... 713/2; 710/104; 713/100

(58) Field of Classification Search .................... 713/2, 713/100; 710/16, 104, 74, 8

See application file for complete search history.

(56) References Cited

U.S. PATENT DOCUMENTS 5,274,816 A * 12/1993 Oka .............................. 713/2
6,061,788 A * 5/2000 Reynaud et al. ............... 713/2
6,105,130 A * 8/2000 Wu et al. ...................... 713/2
6,292,890 B1 * 9/2001 Crisan .......................... 713/2
6,434,696 B1 * 8/2002 Kang ............................ 713/2
6,553,432 B1 * 4/2003 Critz et al. ................... 710/10
6,785,838 B2 * 8/2004 Lim et al. ...................... 714/7
2003/0084278 A1 * 5/2003 Cromer et al. ................. 713/2

* cited by examiner

*Primary Examiner*—Thomas Lee

*Assistant Examiner*—Albert Wang

(74) *Attorney, Agent, or Firm*—Haynes and Boone, LLP

(57) ABSTRACT

An information handling system includes a processor, a storage medium coupled to the processor, and a program stored in the storage medium and executable by the processor. The program is for causing the processor to, in response to a boot event, detect that a device is not present in the information handling system where the device was present in the information handling system during a prior boot event or detect a device that is present but was not present during a prior boot event. The program is also for causing the processor to access a list that indicates a boot order where the list is stored in the storage medium prior to the boot event and including an entry associated with each bootable device. The program is further for causing the processor to store an indicator in the entry where the indicator indicates that the device is dormant or to replace a dormant device in the boot order with a newly present device of the same type.

28 Claims, 3 Drawing Sheets

SYSTEM AND METHOD FOR PRESERVING BOOT ORDER IN AN INFORMATION HANDLING SYSTEM WHEN A BOOT DEVICE IS REPLACED BY A MATCHING DEVICE

BACKGROUND

The disclosures herein relate generally to information handling systems and more particularly to a system and method for maintaining a boot order in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system typically boots using a boot device according to a boot order stored in the system. A boot device may be any device in the system that includes or is coupled to software or other means to cause an operating system of the system to be booted and/or loaded in response to the system being powered up, e.g. being turned on, or reset. The boot order includes a list of boot devices which the system attempts to boot from in response to the system being powered up or reset. If the system does not boot successfully using the first boot device in the list, then the system attempts to boot from the next boot device in the list. The process repeats until either the system boots successfully or the system fails to boot from any of the boot devices on the list.

The boot order may be selected by a user of the information handling system. The user may select the boot order according to a particular use or configuration of the system. Unfortunately, certain events can cause the boot order selected by the user to be altered contrary to the desire of the user. For example, the removal or addition of a device to the system may cause the boot order to be reset to a default boot order specified by a basic input output system (BIOS) or other system firmware, particularly where the BIOS or firmware conforms to a version of the BIOS Boot Specification. The BIOS Boot Specification is available from Phoenix Technologies, Ltd., 411 E. Plumeria Drive, San Jose, Calif. 95134, (800) 677-7305, http://www. phoenix-.com/PlatSS/PDFs/specs-bbs 101. pdf, and is incorporated by reference herein.

It would be desirable to ensure that an information handling system boots using a boot order selected by a user.

Accordingly, what is needed is a system and method for maintaining a boot order in an information handling system.

SUMMARY

One embodiment, accordingly, provides an information handling system that includes a processor, a storage medium coupled to the processor, and a program stored in the storage medium and executable by the processor. The program is for causing the processor to, in response to a first boot event, detect that a first device is not present or is in some way disabled in the information handling system where the first device was present in the information handling system prior to the first boot event. The program is also for causing the processor to access a list that indicates a boot order where the list is stored in the storage medium prior to the first boot event and including a first entry associated with the first device. The program is further for causing the processor to store an indicator in any entry where the indicator indicates that the device is dormant.

A principal advantage of this embodiment is that various shortcomings of previous techniques are overcome. For example, a boot order selected by a user is maintained within an information handling system. In addition, a potential security flaw may be avoided.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
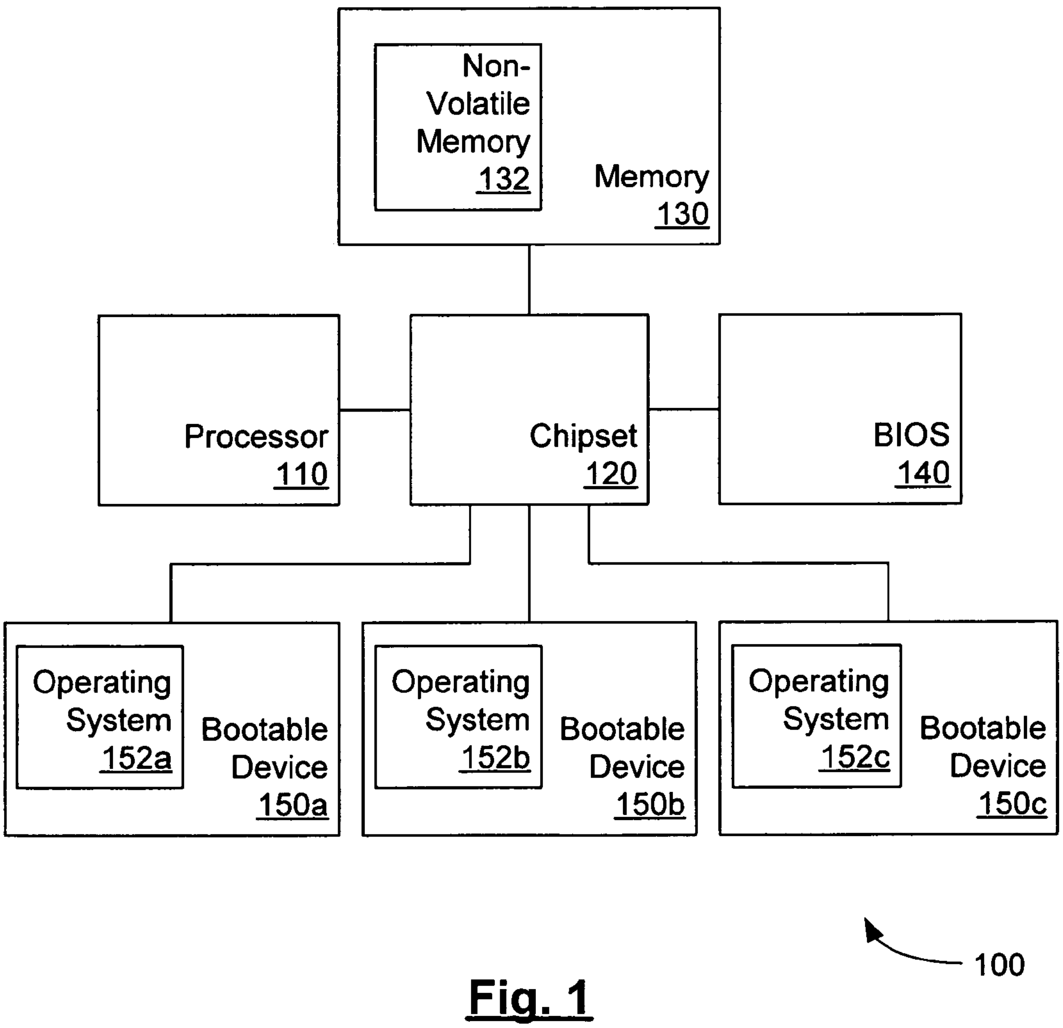
FIG. 1 is a diagram illustrating an embodiment of selected portions of an information handling system for maintaining a boot order.

In one embodiment, an information handling system 100, FIG. 1, includes a processor 110, a chipset 120, a memory 130, a basic input output system (BIOS) 140, and bootable devices 150*a*, 150*b*, and 150*c*. Chipset 120 is coupled to processor 110, memory 130, BIOS 140, and bootable devices 150*a*, 150*b*, and 150*c*. Bootable devices 150*a*, 150*b*, and 150*c* may each include an operating system as indicated by operating systems 152*a*, 152*b*, and 152*c*, respectively. Memory 130 includes a non-volatile memory 132 and may include multiple types of storage media such as RAM, DRAM, SDRAM, FLASH, and other storage devices. Bootable devices 150*a*, 150*b*, and 150*c* are each connected to chipset 120 using a bus such as a PCI or Universal Serial bus, a direct connection to a device controller within chipset 120, or other suitable connection means.

System 100 operates by executing BIOS 140 or a system firmware (not shown) in response to being powered up or reset. BIOS 140 identifies and initializes the components of system 100 and causes an operating system such as operating system 152*a*, 152*b*, or 152*c* to be booted. The booted operating system provides a user of system 100 with an ability to initiate and run one or more applications (not shown) on system 100. The applications may be stored on a storage media of system 100 or on a remote device configured to communicate with system 100. System 100 may be configured to communicate with other devices or information handling systems using wired or wireless communications devices.

System 100 boots using a boot device according to a boot order stored in system 100. A boot device may be any device in system 100, such as memory 130 and devices 150*a*, 150*b*, and 150*c*, that includes or is coupled to software or other means to cause an operating system of the system to be booted and/or loaded in response to a boot event. As used herein, the term "boot event" refers to an event that causes system 100 to be booted such as being powered up, e.g. being turned on, or reset.

The boot order includes a list of boot devices which system 100 attempts to boot from in response to system 100 being powered up or reset. If system 100 does not boot successfully using the first boot device in the list, then system 100 attempts to boot from the next boot device in the list. The process repeats until either system 100 boots successfully or system 100 fails to boot from any of the boot devices on the list.

The boot order is selected by a user or manufacturer of system 100 and stored in some sort of non-volatile memory 132. The boot order includes an entry associated with each boot device. Each entry includes information that identifies its associated boot device.

BIOS 140 is configured to cause the boot order selected by the user or manufacturer to be preserved in response to a device being added to or removed from system 100. To do so, BIOS 140 stores an indicator in the entry associated with each boot device in the boot order. The indicator indicates whether that boot device is active or dormant. A boot device is indicated as being active in response to the boot device being present in system 100, e.g. physically connected by wired or wireless means and recognized by BIOS 140 and/or operating system 152. A boot device is indicated as being dormant in response to the boot device not being present in system 100. Further, a boot device may be disabled from booting by some other indicator even though the device is present in the system.

In response to a boot event, BIOS 140 determines whether one or more bootable devices have been removed from or added to system 100. In response to BIOS 140 detecting that one or more devices have been removed from system 100, BIOS 100 stores an indicator in each corresponding entry in the boot order that indicates that the device is dormant. In response to BIOS 140 detecting that one or more devices have been added to system 100, BIOS 100 determines whether added devices are the same type of device as a device marked as dormant in the boot order list. If an added device is the same type of device, then BIOS 140 effectively substitutes the added device for the dormant device in the boot order list by changing and storing an indicator that indicates that the added device is active. If an added device is not the same type of device as the dormant device, then BIOS 140 creates an entry associated with the added device at the end of the boot order list and stores an indicator in that entry indicating that the added device is active.

Figure 2:
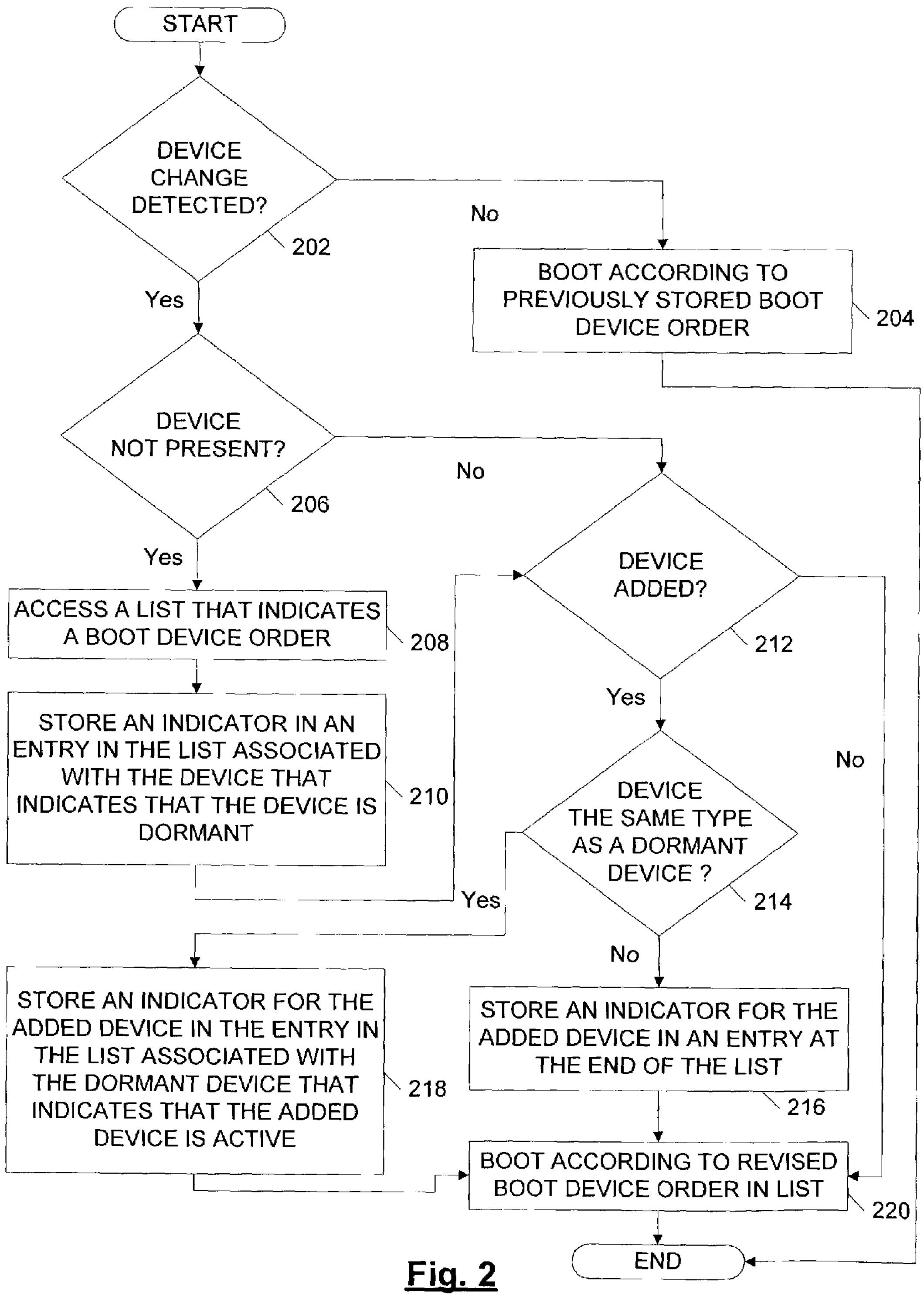
FIG. 2 is a flow chart illustrating an embodiment of a method for maintaining a boot order in an information handling system.

The operation of BIOS 140 will now be described in additional detail with reference to FIG. 2 as well as FIG. 1. As indicated in FIG. 2, BIOS 140 determines whether a device change is detected as indicated in a step 202. A device change may be any change to the set of devices present in system 100, such as memory 130 and devices 150*a*, 150*b*, and 150*c*, at a time prior to the function of step 202 being performed. For example, BIOS 140 may detect a device change in response to a device being added to, removed from, or replaced in system 100. A device change may also be detected where a device malfunctions such that system 100 does not recognize or is unable to locate the device even if the device is physically present in system 100. BIOS 140 may perform the function in step 202 in response to a boot event. If BIOS 140 does not detect a device change, BIOS 140 causes system 100 to boot according to a previously stored boot order as indicated in a step 204.

If BIOS 140 does detect a device change, then BIOS 140 determines whether a device is not present in system 100 as indicated in a step 206. BIOS 140 may perform this function by searching for each device that was present in system 100 prior to a boot event. If BIOS 140 determines that a device that was previously present in system 100 is not currently present, then BIOS 140 accesses a list that indicates a boot order from a storage medium as indicated in a step 208. The list may include an entry for each boot device in system 100 depending on a boot order selected by a user or manufacturer of system 100. An example of such a list is shown in FIGS. 3*a* through 3*e* which illustrate an example of a list 300 that indicates a boot order of devices in system 100 in various states over time. As shown at a first time in FIG. 3*a*, list 300 includes entries 302, 304, and 306 which are associated with a hard drive #1, a floppy drive, and a CD-ROM drive, respectively, and indicate that the boot order for system 100 in this example is hard drive #1 followed by the floppy drive followed by the CD-ROM drive. In the state shown in FIG. 3*a*, each of the entries 302, 304, and 306 includes an indicator that indicates that the devices associated with the entries are active.

Figure 3A:
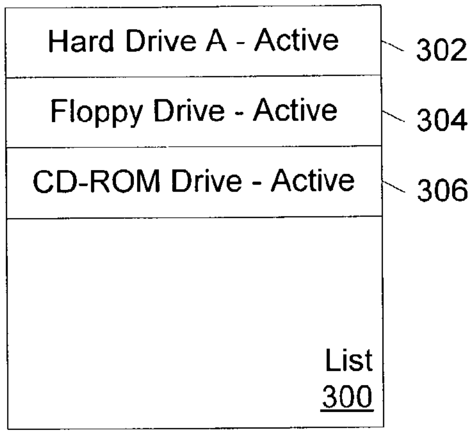
FIG. 3*a* is a diagram illustrating a first example of list that includes a boot order.
Figure 3B:
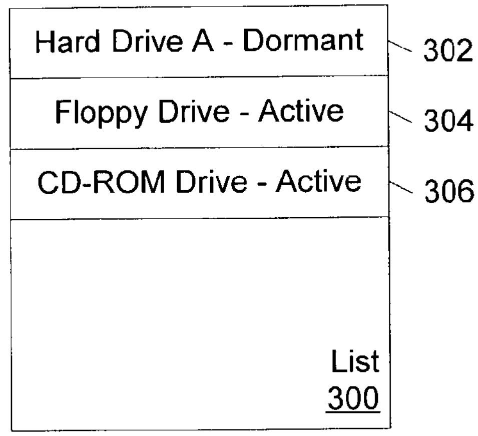
FIG. 3*b* is a diagram illustrating a second example of list that includes a boot order.

Referring back to FIG. 2, BIOS 140 stores an indicator in the entry in the list associated with the device that indicates that the device is dormant as indicated in a step 210. FIG. 3*b* shows list 300 at a second time to illustrate this scenario. In FIG. 3*b*, entry 302 associated with hard drive #1 is marked as dormant indicating that hard drive #1 is not present in system 100. The remaining entries in FIG. 3*b* remain unchanged to effectively maintain the boot order indicated in list 300. Accordingly, in response to a subsequent boot event, BIOS 140 will cause hard drive #1 to be skipped in the boot order such that the boot order in this example will be the floppy drive followed by the CD-ROM drive.

As indicated in a step 212, BIOS 140 determines whether a device has been added to system 100. If a device has not been added, then BIOS 140 will cause system 100 to be booted using the revised boot order in the list in response to a subsequent boot event as indicated in a step 220.

Figure 3C:
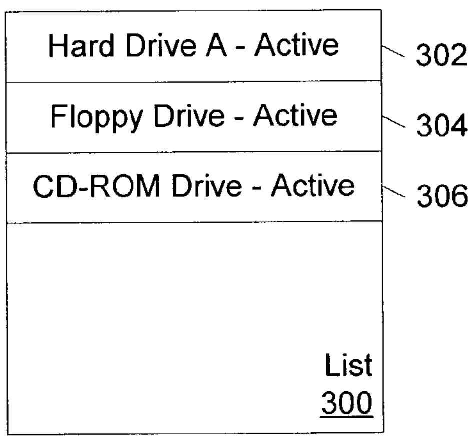
FIG. 3*c* is a diagram illustrating a third example of list that includes a boot order.
Figure 3D:
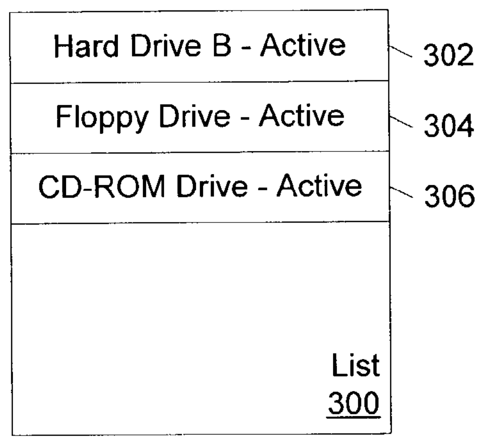
FIG. 3*d* is a diagram illustrating a fourth example of list that includes a boot order.

If a device has been added, then BIOS 140 determines whether the device is the same type of device as a dormant device in the list. The criteria for determining whether an added device is the same type of device as a dormant device may include whether the devices perform the same function or are interchangeable devices. If the added device is the same type of device as a dormant device, then BIOS 140 stores an indicator for the added device in the entry in the list associated with the dormant device that indicates that the added device is active. As a result, the added device effectively replaces the dormant device in the boot order. FIGS. 3*c* and 3*d* show two different examples to illustrate this scenario. Both FIGS. 3*c* and 3*d* assume a device is added to system 100 with list 300 in the state shown in FIG. 3*b*.

In FIG. 3*c*, hard drive #1 is added back to system 100. Accordingly, entry 302 is marked as active to return hard drive #1 to its place in the boot order. As a result, in response to a subsequent boot event, the boot order in this example will be hard drive #1 followed by the floppy drive followed by the CD-ROM drive.

In FIG. 3*d*, hard drive #2 is added to system 100 instead of hard drive #1. Because hard drive #2 is the same type of device as hard drive #1, i.e. both are hard disk drives, hard drive #2 replaces hard drive #1 in the boot order. Accordingly, entry 302 is associated with hard drive #2 and marked as active to allow hard drive #2 to replace hard drive #1 in the boot order. As a result, in response to a subsequent boot event, the boot order in this example will be hard drive #2 followed by the floppy drive followed by the CD-ROM drive.

Figure 3E:
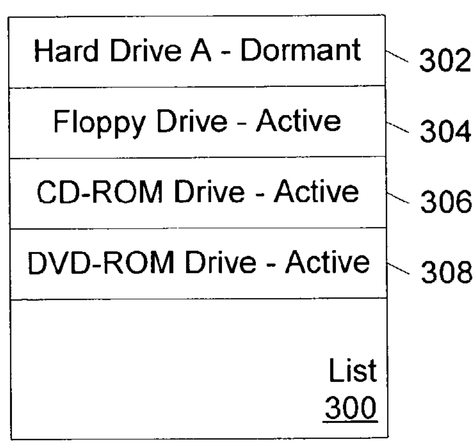
FIG. 3*e* is a diagram illustrating a fifth example of list that includes a boot order.

If the added device is not the same type of device as a dormant device, then BIOS 140 stores an indicator for the added device in a new entry at the end of the list as indicated in a step 216. As a result, the added device is effectively added to the end of the list and becomes the last boot device in the boot order. FIG. 3*e* illustrates this scenario. FIG. 3*e* assumes a device is added to system 100 with list 300 in the state shown in FIG. 3*b*.

In FIG. 3*e*, a Network Adapter is added to system 100. Because the Network Adapter is the not same type of device as the only dormant device in the list, i.e. hard drive #1, entry 308 is created at the end of the list. Accordingly, entry 308 is associated with the Network Adapter and marked as active to add the Network Adapter to the boot order. As a result, in response to a subsequent boot event, the boot order in this example will be the floppy drive followed by the CD-ROM drive followed by the Network Adapter.

Subsequent to steps 216 and 218, BIOS 140 will cause system 100 to be booted using the revised boot order in the list in response to a subsequent boot event as indicated in a step 220.

In other embodiments, the steps illustrated in FIG. 2 may be performed in orders other than those shown. For example, steps 214, 216, and 218 may be performed prior to steps 206, 208 and 210. In addition, one or more of the steps may be repeated where multiple devices have been added to or removed from information handling system 100.

In the embodiment just described, BIOS 140 performs the method shown in FIG. 2. In other embodiments, the method shown in FIG. 2 may be performed by a program other than BIOS 140.

In one particular embodiment, device 150*a* comprises a removable hard disk drive. In other embodiments, device 150*a* as well as devices 150*b* and 150*c* may be any other type and combination of devices, such as CD-ROM drives, Network Adapters, multimedia devices, or storage media, configured to operate in conjunction with information handling system 100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:

a processor;

a storage medium coupled to the processor; and a program stored in the storage medium and executable by the processor for causing the processor to:

in response to a first boot event, detect that a first device is not present in the information handling system, wherein the first device was present in the information handling system prior to the first boot event;

access a list that indicates a boot order, wherein the list is stored in the storage medium prior to the first boot event and including a first entry associated with the first device;

store a first indicator in the first entry, wherein the first indicator indicates that the first device is dormant; and in response to replacing the first device with a second device matching the first device, replace the first device with the second device on the list without resetting the list.

2. The information handling system of claim 1, wherein the program is executable by the processor for causing the processor to:

in response to detecting that the first device is not present in the information handling system, maintain the boot order indicated on the list.

3. The information handling system of claim 2, wherein the program is executable by the processor for causing the processor to:

in response to a boot event subsequent to the first boot event, boot the information handling system using the boot order indicated on the list skipping any device indicated as dormant on the list.

4. The information handling system of claim 1, wherein the program is executable by the processor for causing the processor to:

in response to a second boot event subsequent to the first boot event, detect that the first device is present in the information handling system; and in response to the first device being present in the information handling system, store a second indicator in the first entry, wherein the second indicator indicates that the first device is active.

5. The information handling system of claim 4, wherein the program is executable by the processor for causing the processor to:

in response to a third boot event subsequent to the second boot event, boot the information handling system using the first device according to the boot order indicated on the list.

6. The information handling system of claim 1, wherein the program is executable by the processor for causing the processor to:

in response to a second boot event subsequent to the first boot event, detect that the second device is present in the information handling system, wherein the second device was not present in the information handling system prior to the second boot event; and add a second entry associated with the second device to the list.

7. The information handling system of claim 6, wherein the program is executable by the processor for causing the processor to:

add the second entry associated with the second device to the list such that the second device becomes a last boot device in the boot order of the list in response to the second device being a different type than the first device.

8. The information handling system of claim 1, further comprising:

a basic input output system that includes the program.

9. The information handling system of claim 1, wherein the first device comprises a removable media drive.

10. A method performed by an information handling system comprising:

in response to a first boot event, detecting that a first device is not present in the information handling system, wherein the first device was present in the information handling system prior to the first boot event;

accessing a list that indicates a boot order, wherein the list is stored in the information handling system prior to the first boot event and including a first entry associated with the first device;

storing a first indicator in the first entry, wherein the first indicator indicates that the first device is dormant; and replacing the first device with a second device matching the first device, the second device replacing the first device on the list without resetting the list.

11. The method of claim 10, further comprising:

in response to detecting that the first device is not present in the information handling system, maintaining the boot order indicated on the list.

12. The method of claim 11, further comprising:

in response to a boot event subsequent to the first boot event, booting the information handling system using the boot order indicated on the list skipping any device indicated as dormant on the list.

13. The method of claim 10, further comprising:

in response to a second boot event subsequent to the first boot event, detecting that the first device is present in the information handling system; and in response to the first device being present in the information handling system, storing a second indicator in the first entry, wherein the second indicator indicates that the first device is active.

14. The method of claim 13, further comprising:

in response to a third boot event subsequent to the second boot event, booting the information handling system using the first device according to the boot order indicated on the list.

15. The method of claim 10, further comprising:

in response to a second boot event subsequent to the first boot event, detecting that a second device is present in the information handling system, wherein the second device was not present in the information handling system prior to the second boot event; and adding a second entry associated with the second device to the list.

16. The method of claim 15, further comprising:

adding the second entry associated with the second device to the list such that the second device becomes a last boot device in the boot order of the list in response to the second device being a different type than the first device.

17. An information handling system comprising:

a processor;

a storage medium coupled to the processor; and a program stored in the storage medium and executable by the processor for causing the processor to:

in response to a first boot event, detect that a first device is present in the information handling system, wherein the first device was not present in the information handling system prior to the first boot event;

access a list that indicates a boot order selected by a user, wherein the list is stored in the storage medium prior to the first boot event;

add a first entry associated with the first device to the list;

in response to a second boot event subsequent to the first boot event, boot the information handling system using the boot order indicated in the list; and in response to replacing a previous device with the first device matching the previous device, replace the previous device with the first device on the list without resetting the list.

18. The information handling system of claim 17, wherein the program is executable by the processor for causing the processor to:

add the first entry associated with the first device to the list such that the first device becomes a last boot device in the boot order of the list.

19. The information handling system of claim 17, wherein the program is executable by the processor for causing the processor to:

in response to the second boot event subsequent to the first boot event, boot the information handling system using the boot order indicated on the list skipping any device indicated as dormant on the list.

20. The information handling system of claim 17, wherein the program is executable by the processor for causing the processor to:

in response to a third boot event subsequent to the second boot event, detect that the first device is not present in the information handling system; and in response to the first device not being present in the information handling system, store a first indicator in the first entry, wherein the first indicator indicates that the first device is dormant.

21. The information handling system of claim 20, wherein the program is executable by the processor for causing the processor to:

in response to a fourth boot event subsequent to the third boot event, detect that the first device is present in the information handling system; and in response to the first device being present in the information handling system, store a second indicator in the first entry, wherein the second indicator indicates that the first device is active.

22. The information handling system of claim 17, further comprising:

a basic input output system that includes the program.

23. The information handling system of claim 17, wherein the first device comprises a removable media drive.

24. A method performed by an information handling system comprising:

in response to a first boot event, detecting that a first device is present in the information handling system, wherein the first device was not present in the information handling system prior to the first boot event;

accessing a list that indicates a boot order selected by a user, wherein the list is stored in the information handling system prior to the first boot event;

adding a first entry associated with the first device to the list;

in response to a second boot event subsequent to the first boot event, booting the information handling system using the boot order indicated in the list; and replacing a previous device with the first device matching the previous device, the first device replacing the previous device on the list without resetting the list.

25. The method of claim 24, further comprising:

adding the first entry associated with the first device to the list such that the first device becomes a last boot device in the boot order of the list.

26. The method of claim 24, further comprising:

in response to the second boot event subsequent to the first boot event, booting the information handling system using the boot order indicated on the list skipping any device indicated as dormant on the list.

27. The method of claim 24, further comprising:

in response to a third boot event subsequent to the second boot event, detecting that the first device is not present in the information handling system; and in response to the first device not being present in the information handling system, storing a first indicator in the first entry, wherein the first indicator indicates that the first device is dormant.

28. The method of claim 24, further comprising:

in response to a fourth boot event subsequent to the third boot event, detecting that the first device is present in the information handling system; and in response to the first device being present in the information handling system, storing a second indicator in the first entry, wherein the second indicator indicates that the first device is active.

* * * * *